United States Patent Office 2,947,418
Patented Aug. 2, 1960

2,947,418

PHOSPHATE PROCESS

William R. Gooch, Lake Wales, and Elliott E. Dobson, Tampa, Fla., assignors to Florida Lightweight Products Company, Pembroke, Fla., a corporation of Florida No Drawing. Filed Dec. 23, 1957, Ser. No. 704,306

10 Claims. (Cl. 210—68)

This invention relates to the art of mining and processing phosphate rock. More particularly, this invention is directed to a process for the recovery and utilization of phosphate slimes such as formed and obtained during mining operations of phosphate rock. The process which will be hereinafter set forth can also be used in connection with the recovery of phosphate values from other waste phosphate materials and phosphatic volcanic ash.

In the mining of phosphate rock, typically the overburden is first removed and the crude ore is mined. This phosphate matrix will be generally composed of about ⅓ recoverable phosphate rock, pebbles and/or boulders, about ⅓ sand tailings and about ⅓ of material of less than 150 mesh particle size. The rock, sand, and clay is conveyed from the mining site in any suitable manner, and usually hydraulically through pipes to a washing plant. In the washing plant, the crude matrix passes through a number of operations designed to clean and recover the rock therefrom. In this operation, large streams of water are used and flowed over the rock to separate therefrom the sand tailings, clay, and the small particle material. To an extent, screens are used to provide a further separation, but as a practical matter screening can only be used for separation and recovery of rather large particle material.

It will be appreciated that this technique utilizes tremendous amounts of water and that only a partial recovery of the total phosphate values of the matrix is possible. That is, a large portion of the phosphate content of the matrix will be washed away from the recoverable rock in the form of a sludge or slurry of small particles or fines associated with the fine gangue and will pass out of the plant in the water courses.

In the economics of the operation, it is generally very important to recover as much water as possible for recirculation to the washing plant. To accomplish this, the technique has been to deliver the waste water containing the slurry of fines, gangue, and sand tailings, and any other foreign matter present, into an area where the solids content can settle out. For this purpose, the general practice has been to either use natural depressions in the surrounding terrain, about which retaining dams or dikes are built, or to deposit the slurry in the mine cuts, again contained within extensive and expensive systems of impounding dams. Generally, the slurry of phosphate slimes will contain about 2% to 4% solids by weight, but this figure will vary depending on the character of the matrix and the washing procedure. The general nature and analysis of phosphate slimes is described in United States Patent No. 2,569,323. The slimes solids will gradually settle out of the suspension, and the clarified supernatant water is then drawn off, in what resembles a decantation operation and recycled for use in the plant.

This process is generally carried out by continuous delivery of the phosphate slimes slurry into one impounding area, and continuous settling of solids and overflow of clarified water, until the surface of the settled slimes reaches the top of the dams or dikes. At this point, the settling site must be abandoned and the operations are transferred to new areas or sites for further settling and clarification procedures, as described above.

There are a number of unique characteristics of phosphate slimes which are of critical importance in the above-described operations. Among these are included the fact that the phosphate slimes deposited by the above-described method will not settle during the active cycling period to a solids concentration greater than about 25%. The only possible way for increasing the concentration is through further settling and consolidation of the deposit. Even after several years of storage, however, experience has shown that a state of equilibrium is reached, at a concentration of only about 25% solids. This means, of course, that large quantities of water will be contained in the settled slimes and, accordingly, as will be discussed hereinafter in more detail, a large storage volume is required to retain the settled slimes.

A process of natural evaporation might be expected to remove the water content of the deposit. Of course, if the slimes are stored below ground water level, they will not be subject to such possible evaporation concentration. However, even if the settled material is about ground water level, the further concentration which might have been expected does not occur. Natural evaporation will remove moisture from the surface of the deposit only until a thin crust of material has been dried to about 80% solids. After the upper surface is concentrated by evaporation to about the 80% level, further evaporation of the underlying deposit does not take place. This is due to the fact that in such an evaporation drying process, as the amount of water present gradually decreases until it is about or somewhat more than 20%, the mass becomes virtually impervious to the transfer of moisture. This rather peculiar condition characteristically develops in the zone of deposit immediately under the thin surface crust and effectively prevents the movement of moisture to the exposed surfaces. As a result, it will be seen that the present method of deposition, settling, draining off of the clarified water, and natural evaporation of the deposit will not produce a dried phosphate slime since the deposit automatically seals itself by formation of the crust and prevents further evaporation.

Some loss of water from the settled material can be expected to occur from the underlying surfaces by seepage through the dams or dikes. During the seepage process, however, the suspended solids will be filtered out and concentrated on the dam surface until an impervious layer is deposited. This layer again effectively prevents any further exfiltration of moisture.

Still a further factor which prevents the effective evaporation of water from the slimes deposit is the lush growth of plant life, such as cattails, elders, willows, and fibrous grasses with deep root growth. This lush growth is always present in the storage areas and prevents even more the natural evaporation of the water from the slimes. In addition, the presence of this growth makes much more difficult any mining or utilization of the deposit since the high percentage of fiber and sticks is a severe limiting factor.

Thus, it will be seen that, in the deposit formed by the present methods, all avenues for escape of water become blocked and the entire mass of phosphate slimes will remain indefinitely in a semi-fluid state at a solids concentration of from about 20% to about 25%.

While considerable effort has been directed towards the end of increasing the settling of the solids content of the slurry, such as by the introduction of flocculating agents or other additives, these methods have resulted in only slight improvements. Generally, such techniques have only accelerated the rate of settling and have not been successful in increasing the ultimate concentration of the slimes mentioned above.

As a result, it has been economically unfeasible to utilize the phosphate content of the slimes. This is so because the handling and treating of the semi-fluid deposit containing from 75% to 80% water is, from a practical point of view, impossible. Material of that character has the consistency of mud and the added water content not only gives added weight and volume, leading to higher transport costs even aside from the sheer problem of moving it in a simple fashion.

The ultimate proportion of solids to water in the phosphate slimes deposit is also of importance in regard to the initial problem of storage, as will be seen from the following considerations:

(a) The phosphate matrix in its natural state is at a concentration of about 70% solids.

(b) The volume occupied by one ton of the dry matrix and the water contained therein, is about 26.1 cubic feet.

(c) For each ton of matrix which is mined about 0.33 ton of dry solids content of slimes must be removed and deposited in the settling areas.

(d) The volume occupied by 0.33 ton of dry solids content of slimes at about 20% slimes concentration is about 46.8 cubic feet.

(e) For every 26.1 cubic feet of matrix which is excavated some 46.8 cubic feet of storage space is required for the disposal of the slimes.

(f) Thus, for an original excavation of 26.1 cubic feet, an additional storage volume of 20.7 cubic feet is required and, of necessity, this additional volume must be above ground.

For the above reasons, it is clear that the current techniques of slimes disposal impose very high additional costs on phosphate mining operations and result in a slimes deposit containing a large fraction of the original phosphate values in the ore which cannot be utilized.

It is an object of the present invention to overcome the above-described disadvantages and to provide a process and technique for the drying and storage of phosphate slimes which will provide a deposit having a higher solids concentration than has hitherto been possible.

More particularly, it is an object of this invention to provide a process and technique for the drying and storage of phosphate slimes at a high solids content in a form such that the phosphate values of the slimes can be economically recovered and utilized.

It is a further object of this invention to provide a process and technique for drying and storage of phosphate slimes whereby there is provided not only a high solids concentration but also a deposit having a regularly graduated particle size distribution such that the separate utilization of the solids content of varying particle sizes is possible.

More particularly, it is an object of this invention to provide a process for the drying and storage of phosphate slimes by a novel method of delivery of the water slurry from the washing plant so that successive layers of the slimes are deposited and allowed to independently settle and dry whereby there is formed a deposit of slimes having an average solids concentration up to about 50% and which will retain such concentration under conditions of re-wetting.

It will also be seen that a further object of this invention is to provide a method for the storage and disposal of phosphate slimes in greatly reduced storage volume space.

Still a further object of this invention is to provide a method and technique for the drying and storage of phosphate slimes which will effectively eliminate the growth of plant life in the storage area.

Additional objects will become apparent from the following description.

The process of the present invention results from the fact that we have discovered a heretofore unrecognized characteristic of phosphate slimes which is of the utmost importance. This discovery not only explains why the slimes do not dry out in the present methods and systems but is also a critical feature in the efficacy of our novel process.

Fundamentally, the discovery is this: If a surface or mass of phosphate slimes has once been partially dried to a given point, it will not reabsorb moisture to any significant degree even though it be flooded and remain inundated for a considerable period of time. This means that, if a process is carried out whereby phosphate slimes are once dried to a given level of solids concentration, they will remain in substantially that state of concentration regardless of further exposure to water. We make use of this discovery in the following manner: A series of two or more comparatively small storage and evaporating areas are constructed. The slurry suspension of the slimes is introduced to each area for a short period of time in rotation. The quantity of input in each cycle is controlled at an amount such that the solids will settle, the surface clarified water may be drained off, and the resulting depth of semi-settled solids will be such that the entire thickness of the layer will be able to lose the substantial part of its moisture content and dry by natural evaporation, and the sealing in of the undesired large excess of water is avoided. Typically, the exposed upper surface of the layer will quite readily dry to a water content of about 20%. The solids content in the lower surface of the layer will depend on the regulation at the discretion of the operator and can be controlled so that it is up to about 50% or higher.

Thereafter, a second portion of the slime suspension can be introduced into the area and will inundate the surface of the previously formed layer. This second layer will then settle, the clarified water will be drawn off, and the same process of evaporation will take place to form a layer having similar solids concentrations as the first formed layer. Even though the previously formed layer will in this process be completely covered with water, the previously obtained high solids concentration therein will not be substantially reduced during the process. Thereafter, further layers are formed in the same manner.

During the above-described cyclical operation, there will be gradually built up a deposit of phosphate slimes having a high solids concentration. A typical commercial operation, taking into consideration the economic balance between the factors of time, volume of slimes to be handled, and the desired form thereof, may result in series of layers wherein the uppermost strata of each has a solids content of about 40% at the bottom and about 70% at the top, the average being about 55% solids. When the area is again flooded, with fresh slimes, the surface solids content may be reduced to about 60%. However, the bottom will remain about 40%. The average will then be about 50%. As succeeding layers are deposited, the average solids content of the lower strata which had been formed will remain virtually unchanged at about an average of 50%.

The volume occupied by one ton of slimes in the partially dry state of a concentration of about 50% solids is approximately 44.3 cubic feet. Since the volume occupied by one ton of settled slimes at 20% solids, as obtained by current techniques, is around 140.3 cubic feet, it will be seen that our invention substantially reduces the storage volume required for a given amount of phosphate slimes solids. In fact, the volume for storage of an equal weight of solids content of slimes at a 50% solids concentration is only about 32% of the volume required for the same dry weight of the slimes at a concentration of about 20% by weight. The important advantage thereby resulting is immediately obvious. For instance, the storage volume required of the slimes is now about 50% less than the volume excavated during the mining of the amount of phosphate matrix from which the slimes are obtained. This means, of course, that, if the excavations are above the water table, they would provide sufficient storage volume themselves and the usual system of dikes and dams is not required.

In addition, however, our invention provides very substantial additional advantages entirely above and beyond this important reduction of storage volume. For instance, slimes existing at a solids content of 50%, or even 40% solids, no longer exist as thick liquids but have become instead moist solids with considerable load-carrying capacity (unlike most non-consolidated argillaceous deposits). Accordingly, the removal and utilization of the phosphate slimes which was hitherto practically impossible can now be achieved in an economically feasible and comparative simple process which may be accomplished by any number of the common materials handling systems.

It will be appreciated that this process now makes it possible to utilize the natural means of moisture removal at no additional cost for fuel whatsoever. Once the dried slimes have been broken up and removed from the storage deposit, they may then be stored in open air stockpiles. Even repeated heavy rains will only wet the exposed layers of such stockpiles to a depth of from six to twenty inches. The material will then automatically seal itself and the entire pile inside the sealed layer remains at the same dry, high-solids concentration, as originally stored, indefinitely. This discovery greatly reduces the size of covered storage buildings required to protect the dried condition of the slimes prior to further processing, as in a plant for the manufacture of light weight aggregate therefrom.

Our invention also contemplates additional refinements of the above-described general techniques. In particular, while the rate of natural evaporation of water from the semi-settled solids is relatively fast when the thin layers are deposited over the previously dried beds, we have found that the rate can be further substantially accelerated, and the time substantially reduced, by agitation and stirring. This procedure is carried out after the slimes have substantially settled out of the suspension and the surface water has been drained off. If the initial subsequent drying by evaporation at the very surface of the uppermost layer takes place, there will be an incipient tendency for further evaporation to be impeded by the increased concentration at this surface layer. By agitation of the surface, which at this point has the consistency of soft, muddy clay, this layer formation can be broken up and the evaporation will then continue. The free water in the underlying levels will be brought to the surface where it will evaporate much more rapidly. Suitable means for this agitation may be, for instance, an air boat towing a drag rake or chains. A float can also be dragged across the surface as with a double drum winch.

The thorough drying of the layer can be further accelerated by treatment thereof after a relatively dry crust has been formed. Characteristically, the entire upper layer will remain smooth and unbroken until sufficient water has evaporated to cause shrinkage cracks. However, if the top layer is scored while it is still in the smooth surface state, crevicing is brought about much more rapidly. Once the surface is covered with fissures, the remaining water in the layer will evaporate at an accelerated rate and the cycling is greatly speeded up. By using this method, the number and area of evaporating beds required to store or remove a large volume of material is greatly reduced.

For some purposes, it is particularly desired to have a dried slime of a solid concentration in the neighborhood of 80%. While our general method will provide an average solids concentration of around 50 to 60%, it can also be utilized as a constant source of supply of 80% solids material by continuously scarifying the surface of the bed and removing only a layer of about two to three inches between scarifications. The remaining material will then further evaporate to the 80% level and a supply of such highly concentrated material is available on a regular production schedule.

Still a further technique of our invention lies in the provision of a slimes deposit having a highly desirable sorting of ingredients in the evaporating beds of the phosphatic volcanic ash. This is provided by the method of controlled replacement in thin layers. During the period of delivery of the slimes slurry to the evaporating beds through the pipe line, it is found that the great amount of objectionable debris is settled out within a relatively close area to a point of input. This is so because of the limited amount of material delivered at any one time to the beds. As a result, with our invention, there is no need to provide and operate expensive mechanical or other facilities for eliminating such debris. As mentioned heretofore, it is difficult to make a separation of screen fractions finer than 100 mesh with mechanical equipment due to the great volume of material flowing from the washing plant.

The greater the distance the slimes flow over the surface of the evaporating beds, the smaller the particle size becomes as it settles out of the solution. Also, progressively, the chemical analysis of the deposit is altered in the same manner as the particle size. For instance, the ingredients, such as silica, iron, and phosphate pebble, having a higher specific gravity, settle and are deposited nearer the point of input than the other ingredients. It will be appreciated in this connection, that even though particles of silica or iron may be smaller than other particles of alumina or calcium-containing material, they may still be heavier because of the higher specific gravity.

For one end product (lightweight aggregate) a coarse-grained clay with a high phosphate pebble, iron, and sand content is objectionable and unsuited to our process. However, in other applications, these ingredients would prove desirable. The controlled sorting which takes place in this raw material replacement process provides a means for the recovery of any suitable product for a specific purpose simply by mining the area providing the proper choice. We may mine the deposit from one end to the half-way point of a long, rectangular evaporating bed for one type of deposited material and the opposite end for another usage, storing in separate stockpiles. We may also vary the demarcation line for recovery of other selected combinations of particle size and chemical ingredients. The dimensional proportions or size of the settling area can be designed to provide the most suitable conditions for obtaining the desired sorting.

If badly contaminated with debris such as phosphate pebble and sand tailings of screen fractions at plus 100 mesh, phosphate slimes will not dry by natural evaporation into the desired tough lumps, but become soft and mealy. This prevents satisfactory crushing and screening into predetermined pre-sized grading for certain further processing. Removing this debris by our simple method of bed sorting results, after evaporation, in tough, dense, hard lumps which can be handled many times from mine to stockpile, and through various process steps in the plant, without deterioration into total fines. Each separate screen fraction retains its homogeneity. The non-contaminated dry clayey lumps can be thus pre-sized into any desired graduation.

The extent and nature of the above-described bed-sorting is a function of the nature of the slurry input, the concentration of the slurry, and the amount of input of slurry in each cycle, particularly in relation to the surface area of the evaporating beds. While the layers can be made as thin as desired, from a commercial point of view, the settled layer will generally be at least one to six inches thick, although this is not necessarily the limitation on the operativeness or principle of the invention. In order to form a bed from typical matrix sources of the slimes having an ultimate solids concentration of, on the average, about 50%, we prefer to spread the bed in such a manner that the thickness of the settled slimes layers will not exceed four inches. It will be appreciated, of course, that, in some instances, greater thicknesses may be employed which will still not be thick enough to prevent the eventual adequate evaporation of the moisture content from the entire layer. The slurry solids concentration used is that regularly obtained from the washing operation and is not a factor which we would customarily control for the purpose of forming the desired evaporation bed layers. It will normally vary from anywhere between about 3% to 10%, although clearly the invention is not limited to any specific concentration. Any slurry will exhibit the necessary characteristic of permitting the solids to settle so that the clarified surface water can be drained off the top.

As previously mentioned, when slimes are discarded by the present practice into deep water ponds, highly objectionable dense growths of cattails, elders, willows and tough fibrous grasses, with deep root growths are always present. This lush growth effectively prevents evaporation of the water from the slimes by the sun. Mining the material is also made more difficult and the high percentage of fiber and sticks mixed with it is a limiting factor in its use development. With our method of shallow layer drying and cycling there is not enough water present to support the lush growth of plant life. Therefore, after we have deposited the final layer, and recovery is on a production basis, the material will be removed before a lush form of plant life can develop.

A further feature of our invention lies in its application to the now existing abandoned settling ponds of the old type. For instance, the central Florida mining area produces in excess of seven million tons, by weight, of slimes annually. Obviously, a tremendous tonnage has accumulated over the past twenty-five years or more and, consequently, there has developed an immense natural resource of phosphatic volcanic ash containing phosphate and/or other minerals. The utilization of these deposits has been prevented because all previous research had been on mechanical dewatering or artificial means of evaporation and our process and principle of operation was not known. The present invention can be directly applied to such currently unusable deposits by dredging and pumping the material therefrom to the above grade evaporating beds in successively formed thin layers. The previously described drying and evaporation procedures will again take place, followed by re-deposit of additional layers in the manner set forth. We therefore, provide for the first time a feasible commercial method for utilizing the slimes as raw material for the production of lightweight aggregate.

While our invention is clearly not limited to any ultimate application in which the product from our process is used, a number of the contemplated or expected uses of dried phosphatic volcanic ash slimes are known. These include firing of the lumps to produce lightweight aggregate for its many and varied end uses. In addition, the material can be used for the filtering and/or clarifying of oil, as a filler in mixed fertilizers, or for other agricultural purposes, including direct application to the soil to increase the phosphate value thereof, and/or to hold water, like vermiculite. In addition, the material can be finely ground and used as a carrier or diluent for insecticide dusts or sprays or it can be used as a mineral filler for animal and poultry feeds and the like. Drilling muds similar to bentonite can also be manufactured therefrom or the material may be used alone to produce autoclaved blocks and/or other autoclaved products. This material may be used as a partial replacement for Portland cement or other bonding agents to make blocks or other concrete products; or used alone or in combination with clays to produce brick, tile, or other ceramic products. It is also possible to combine the dry slimes with other materials, such limestone, dolomite, or other elements to make products such as glass wool. Furthermore, it is possible to utilize the dried slimes as source material for the recovery of phosphorous and/or other chemicals by physical, electrostatic, flotation, air, and/or other means. There are, indeed, a host of uses for this material and this fact makes it all the more remarkable that the industry has been unable to develop a suitable process to utilize the existing deposits mentioned above.

In order to further illustrate our invention, the following examples set forth specific conditions which may be employed although it must be appreciated that the invention is not to be construed as limited to the particular operations set forth therein.

Example I

A phosphate slimes slurry having a solids concentration of about 7% was delivered from a washing plant to a suitable evaporation area which had generally dimensions of about 67 yards long and 33 yards wide. The evaporation area was above ground level and enclosed by banks about six feet high.

The slurry was delivered to the area until there was a depth of about 20 inches. After the solids had settled out, the clarified surface water was withdrawn. There remained a layer of settled slimes solids of about 3 inches deep. After the period of about thirty days (under normal conditions of temperature and sunshine), a dried layer having a solids concentration of about 75% in the upper 10% thereof and about 40% in the lowermost strata was formed, and the average solids concentration throughout the layer was about 50%.

This procedure using approximately similar quantities of slurry input was followed to deposit additional layers of settled solids, each having a thickness between 2 and 3 inches. A total of about four layers were deposited in this manner. The final dried bed had a solids concentration of an overall average of about 50%. On mining this bed, the dried material was obtained in lumps which were easily handled by normal machinery and can be used in the various applications mentioned above.

Example II

The procedure of Example I was followed but this time using a slurry having a solids concentration of about 3%. The evaporating area had dimensions of about 67 yards long, 33 yards wide, and was about 6 feet deep. The layers were formed so that the settled slimes layer, after removal of the clarified water had a depth of about 6 inches. Each layer dried under normal conditions of temperature and sunshine in about ninety days.

The ultimate overall solids concentration obtained in evaporated bed was about 50% and could again be mined in the form of lumps suitable for varied further processing.

Example III

The procedure of Example I was followed but this time using a slurry having a solids concentration of about 10%. The evaporating area had dimensions of about 67 yards long, 33 yards wide, and was about 6 feet deep. The layers were formed so that the settled slimes layer, after removal of the clarified water had a depth of about one inch. Each layer dried under normal conditions of temperature and sunshine in about ten days.

The ultimate overall solids concentration obtained in the evaporated bed was about 50% and could again be mined in the form of lumps suitable for varied further processing.

*Example IV*

The procedure of Example III was again followed except that, when the top seal had begun to form, a rake was dragged across the surface of the deposit. Using this technique, the total time for drying of each layer to provide an average solids concentration of about 50% was only about seven days.

*Example V*

The procedure of any of Examples I through IV was again followed except that, when the average solids concentration was about 30%, the layer was agitated to rapidly bring free water to the surface. After this accumulated water was drained off, the entire layer was turned over again. Using this technique, the total time for drying of each layer (1 inch through 6 inches) to provide an average concentration of about 50%, was cut in half.

*Example VI*

The procedure of any of Examples I through V was followed until the average solids concentration was about 50%. Then, the upper 2 to 3 inch layer was disked and/or scarified into various sized lumps which became scattered over the surface. After they were exposed to the sun and air for a period of from one to two days, they reached a solids concentration of about 80% to 85%, after which time they were picked up and removed to stockpile.

In none of the above examples was any significant plant growth observed to develop even though in some instances the mining of the deposit did not take place for some time after the deposit had been fully formed.

It will be appreciated that the foregoing description sets forth the general principles of our invention and that modifications thereof can be made without departing from the fundamental methods of operation and our concept thereof. Accordingly, our invention is limited only by the following claims.

We claim:

1. A process for forming dried phosphate slimes which comprises forming sequentially a series of layers of dried slimes by delivering separate portions of a slurry containing such slimes to a drying bed, allowing the solids content of said slurry to settle, draining off the clarified surface water from the settled slimes layer thereby formed and allowing each settled layer to dry by natural evaporation prior to forming a second settled slimes layer in like manner on top of said dried settled layer.

2. A process which comprises delivering a first portion of a slurry of phosphate slimes to a drying area, allowing the solids content of said first portion to settle, draining off the clarified surface water, allowing the layer of settled slimes to dry by natural evaporation to form a first layer of dried slimes, delivering a second portion of said slurry to said area on top of said first layer of dried slimes, allowing the solids content of said second slurry to settle, draining off the clarified surface water and allowing the second layer of settled slimes to dry by natural evaporation to form a second layer of dried slimes, and thereafter continuing to form at least one more such layer in like manner on top of such formed layers.

3. A process for drying phosphate slimes which comprises intermittently flowing successive portions of a slurry of phosphate slimes into a drying bed, and allowing the solids content of each portion of the slurry to settle, drain and dry by natural evaporation, prior to introducing each later successive portion of said slurry to said drying bed whereby a plurality of superposed dried layers of said slimes is built up in said drying bed.

4. A process for forming a bed of dried phosphate slimes which comprises forming a series of layers of dried slimes vertically disposed on top of each other by introducing successive portions of a slurry suspension of said slimes into the bed area, allowing the solids content of each portion to settle, drain, and dry by natural evaporation prior to the introduction of the next portion of said slurry.

5. A process for forming dried phosphate slimes which comprises forming a first layer of dried slimes by introducing a portion of a slurry suspension of phosphate slimes into a drying area allowing the solids content to settle, draining off the clarified surface water, allowing the layer of settled slimes to dry by natural evaporation while intermittently agitating the layer during evaporation, and thereafter delivering a second portion of said slurry to said area on top of said first layer of dried slimes and repeating the treatment of said first layer with said second layer.

6. A process for drying phosphate slimes which comprises delivering a portion of a slurry of phosphate slimes to a drying area, allowing the solids content of said slurry to settle, draining off the clarified surface water, allowing the layer of settled slimes to dry by natural evaporation until a surface crust has begun to form, scoring said surface crust to form cracks therein, and thereafter allowing the layer to further dry by natural evaporation, and sequentially forming successive layers of dried phosphate slimes on top of said first layer by repeating the process applied to said first layer.

7. A process for forming dried phosphate slimes which comprises forming a bed comprising a series of layers of dried phosphate slimes by successively introducing portions of a slurry of said slimes into an excavated drying area in an amount such that each portion will form after settling a layer of settled slimes having a depth up to about six inches, draining the clarified surface water from each of said settled layers after it is formed, and allowing each of said settled layers to dry by natural evaporation prior to forming a further layer.

8. A process for forming and recovering dried phosphate slimes having a solids content of about 80% which comprises forming a bed comprising a series of layers of dried phosphate slimes formed according to the process of claim 7, and thereafter successively removing surface layers from the bed to a depth of from about two to about three inches and allowing the remainder of the bed to dry by natural evaporation between each said removal prior to removal of further surface layers.

9. A process for forming and recovering dried phosphate slimes which comprises forming a bed of said slimes according to the process of claim 7, wherein said slurry is introduced into said drying area and allowed to flow over the surface thereof, whereby the solids content of said slimes is deposited upon settling according to predetermined horizontal area-wise gradation in particle size and thereafter successive areas of the bed are mined vertically to obtain dried phosphate slimes therefrom having said predetermined particle size and predetermined chemical composition in each of said areas.

10. A process for forming phosphate slimes having an average solids content of from about 40% to about 70% which comprises introducing a portion of the slurry of phosphate slimes containing from about 2% to about 4% of slimes solids into a drying bed area, allowing the solids to settle out, draining the surface water therefrom to form a settled layer of slimes having a thickness of from about one inch to about six inches, allowing said settled layer to dry by open air evaporation to a solids content varying from about 75% in the uppermost strata of said layer to about 40% in the lowermost strata of said layer, and an average solids content in said layer of about 55% solids, and thereafter forming a second layer of settled slimes corresponding to said first layer and allowing said second layer to dry by open air evaporation, whereby the solids content of said uppermost strata of said first layer is reduced to about 60% solids and the overall average solids content of said first layer is reduced to about 50% solids, and said second dried layer has a solids content corresponding to said first layer, and repeating the process to form further layers.

References Cited in the file of this patent

UNITED STATES PATENTS

| | | |
|---|---|---|
| 2,532,924 | Lesesne | Dec. 5, 1950 |
| 2,636,555 | Klepetko | Apr. 28, 1953 |

OTHER REFERENCES

Besselievre, "Industrial Waste Treatment," publ. by McGraw-Hill, N.Y. 1952, 1st ed., pages 160–162 relied upon.